INVENTOR.
PAUL P. WUESTHOFF
BY Cohn and Powell
ATTORNEY.

April 26, 1966 P. P. WUESTHOFF 3,247,739
VARIABLE SPEED TRANSMISSION
Filed Nov. 8, 1963 4 Sheets-Sheet 2

INVENTOR.
PAUL P. WUESTHOFF
BY Cohn and Powell
ATTORNEY.

April 26, 1966 P. P. WUESTHOFF 3,247,739
VARIABLE SPEED TRANSMISSION
Filed Nov. 8, 1963 4 Sheets-Sheet 3

INVENTOR.
PAUL P. WUESTHOFF
BY Cohn and Powell
ATTORNEY.

INVENTOR.
PAUL P. WUESTHOFF

United States Patent Office 3,247,739
Patented Apr. 26, 1966

3,247,739
VARIABLE SPEED TRANSMISSION
Paul P. Wuesthoff, St. Louis, Mo., assignor to The Pandjiris Weldment Co., St. Louis, Mo., a corporation of Missouri
Filed Nov. 8, 1963, Ser. No. 322,430
13 Claims. (Cl. 74—722)

This invention relates generally to improvements in a variable speed transmission, and more particuarly to an improved drive mechanism that cooperates with a variable and a constant speed differential.

An important object is achieved by the provision of means for oscillating a motor about a pivot axis to vary the speed selectively of a variable speed input shaft of a differential interconnected to the motor shaft by a power transmission means, and yet enable the motor to drive the other differential input shaft at a constant speed through another power transmission means.

Another important objective is realized in that the power transmission means operatively interconnecting the motor shaft and constant speed input shaft of the differential includes a drive element rotatively mounted on the same pivot axis about which the motor platform oscillates so that the motor drives this input shaft at a constant speed independent of the oscillatory movement of the motor platform and motor.

Still another important objective is provided in that the power transmission means interconnecting the motor shaft with the variable speed input shaft of the differential includes a drive element adjustable automatically to different speeds upon selective oscillatory movement of the motor platform about the pivot axis.

An important object is afforded in that one power transmission means includes a first drive element drivingly connected to the motor and drivingly interconnected by a first flexible member to a second drive element rotatively mounted at the axis, and a third drive element rotatable with the second drive element and drivingly interconnected by a second flexible member to a fourth drive element drivingly connected to the constant speed input shaft of the differential, whereby the motor drives the input shaft at a constant speed regardless of the oscillatory movement of the motor platform about the pivot axis.

Another important objective is achieved in that the other power transmission means includes a first drive element drivingly connected to the variable speed input shaft of the differential and drivingly interconnected by a flexible member to a second drive element drivingly connected to the motor shaft, one of the drive elements being variably adjustable to provide speed changes upon oscillatory movement of the motor platform about the pivot axis.

Yet another important object is realized by the structural arrangement of a screw shaft threadedly connected to the platform to oscillate the platform selectively to desired positions upon turning the screw shaft.

Other important advantages are attained in that the platform can be adjusted by the operation of a speed-change motor to turn the screw shaft or otherwise oscillate the motor platform.

Another important objective is afforded by the provision of means operatively connected to the output shaft of the differential and to the mechanism for removably adjusting the oscillatory position of the motor platform whereby the motor platform position is adjusted automatically in response to variations of output shaft speed so as to maintain a predetermined output shaft speed.

An important objective is provided by mounting the motor platform to a stub shaft and by mounting the idler drive element of one power transmission means on another stub shaft, the stub shafts having a common axis.

It is an important objective to provide a variable speed transmission that is simple and durable in construction, economical to manufacture and assemble, highly efficient in operation, and which can be advantageously utilized in many different fields.

The foregoing and numerous other objects and advantages of the invention will more clearly appear from the following detailed description of a preferred embodiment, particularly when considered in connection with the accompanying drawings, in which.

Figure 4:
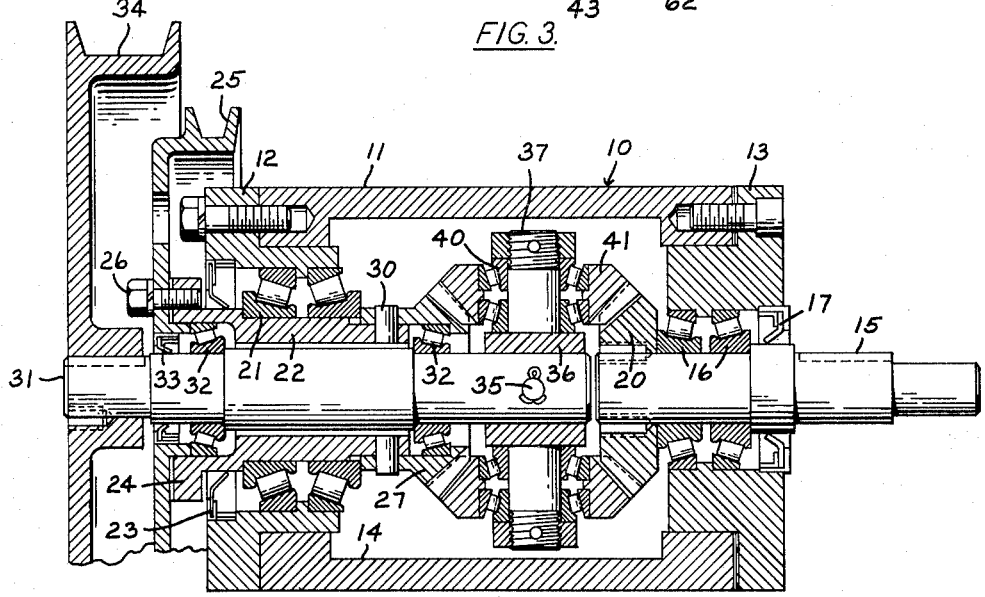
FIG. 4 is a cross sectional view of the differential gearing.

Referring now by characters of reference to the drawings and first to FIG. 4, it will be noted that the differential generally indicated at 10 includes a casing 11 closed at the front by plate 12 and at the rear by plate 13. The casing 11 defines a chamber 14. An output shaft 15 is rotatively mounted by thrust bearings 16 in the rear plate 13. A sealing collar 17 effectively closes the opening in rear plate 13 through which the output shaft 15 extends. Drivingly attached to the end of output shaft 15 and located within the chamber 14 is a side bevel gear 20.

Rotatively mounted in the opposite front plate 12 by a pair of thrust bearings 21 is a tubular input shaft 22. The opening in front plate 12 through which the input shaft 22 extends is closed effectively by a sealing collar 23 disposed between the shaft 22 and plate 12. The outer end of tubular input shaft 22 is provided with a flange 24 that is attached to a substantially cup-shaped sheave 25 by a plurality of bolts 26.

A side bevel gear 27 is drivingly attached to the inner end of the tubular input shaft 22 by a transverse pin 30. As will be explained upon later description of parts, the input shaft 22 and hence the side bevel gear 27 are rotated at a constant speed. The side bevel gear 27 is disposed in spaced, directly opposed relation to the other cooperating side bevel gear 20.

Extending through and mounted in the tubular constant speed input shaft 22 is a variable speed input shaft 31, the shaft 31 being mounted by a pair of axially spaced thrust bearings 32. A closure 33 between the input shaft 31 and the center opening of sheave 25 provides an effective seal. Mounted on the outer end of input shaft 31 is a drive sheave 34.

Drivingly connected to the inner end of input shaft 31 by a transverse pin 35 is a spider 36 located between the side bevel gears 20 and 27. A pair of stub shafts 37 are secured to and extend laterally outward from the spider 36. Mounted rotatively by thrust bearings 40 on each stub shaft 37 is a bevel gear 41, the spider bevel gears 41 meshing with the side bevel gears 20 and 27.

As will appear, the shaft 22 and hence the side bevel gear 27 are driven at a relatively constant speed, while the input shaft 31 and the spider gears 41 are turned at predetermined variable speeds, whereby the side bevel gear 20 and the output shaft 15 are rotated at a desired speed.

The unit includes a base 42 on which is mounted the differential 10. Attached to and extending upwardly from the base 42 is a post 43 having a substantially horizontally disposed tubular sleeve 44. A stub shaft 45 is rotatively mounted within the sleeve 44 by a needle bearing 46. The stub shaft 45 extends outwardly from one end of sleeve 44 on an axis substantially parallel to the axis of the differential 10. Attached to the outer end of stub shaft 45 by nut 47 is the substantially vertical arm 50 of a platform 51. An electric motor 52 is bolted to the platform 51 and is movable with the platform 51 upon oscillatory movement about the axis defined by stub shaft 45.

Figure 1:
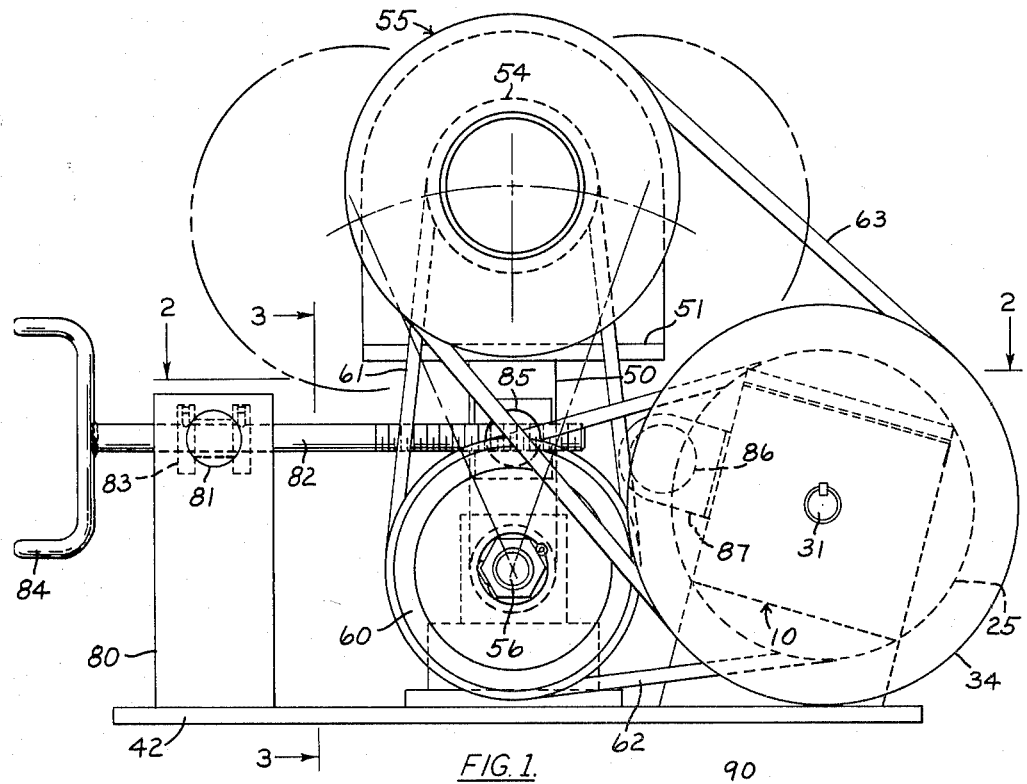
FIG. 1 is a front elevational view of the variable speed transmission, the broken lines indicating the oscillatory movement of the motor platform and motor.
Figure 2:
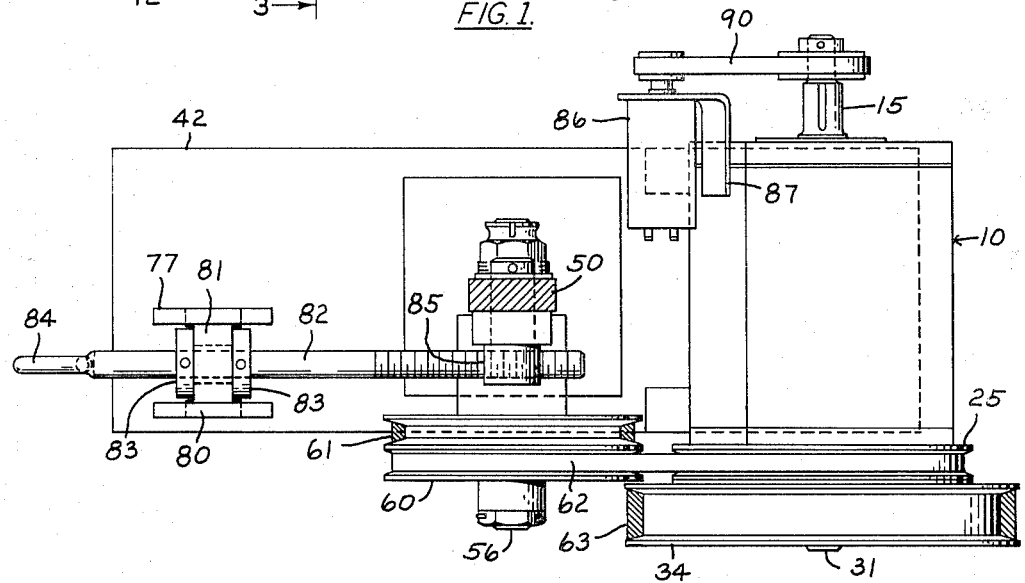
FIG. 2 is a top plan view, partly in cross section, as seen along line 2—2 of FIG. 1.
Figure 3:
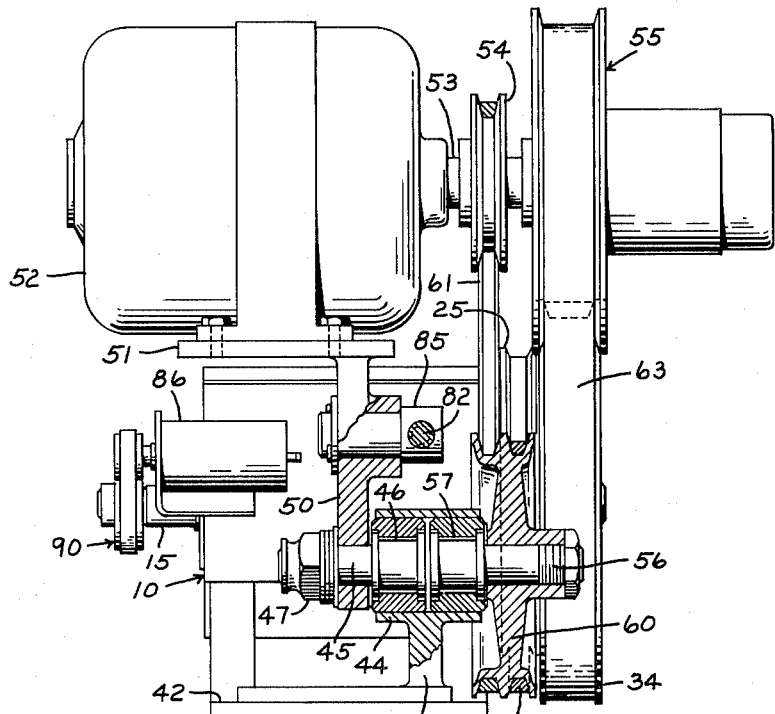
FIG. 3 is an end view as seen along line 3—3 of FIG. 1.

The motor 52 includes a drive shaft 53. A sheave 54 is drivingly attached to and rotatable with the drive shaft 53. The outer end of the motor drive shaft 53 is drivingly connected to a variable speed sheave generally indicated at 55 in FIG. 3, but shown in detail in FIG. 7 and later described.

Another stub shaft 56 is rotatively mounted by needle bearing 57 within the tubular post sleeve 44, the stub shaft 56 extending outwardly of the other end of sleeve 44. Drivingly mounted on the outer end of stub shaft 56 is an idler sheave 60 constituting a double pulley. A drive belt 61 operatively interconnects the motor sheave 54 with one groove of the idler sheave 60. Another belt 62 operatively connects the other groove of idler sheave 60 with sheave 25 to drive the constant speed input shaft 22. A belt 63 operatively interconnects the variable sheave 55 with the sheave 34 to drive the variable speed input shaft 31 of the differential 10.

Figure 7:
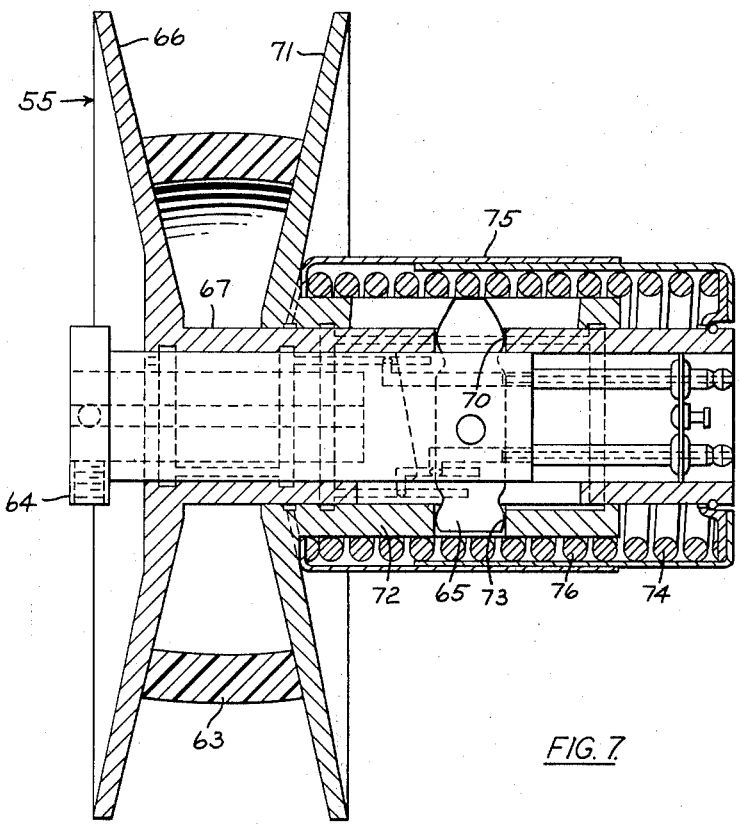
FIG. 7 is a cross sectional view of a variable sheave utilized in one of the power transmission lines interconnecting the motor shaft with the differential.

From FIG. 7, it is seen that the variable sheave 55 includes a center shaft 64 adapted to be drivingly attached to the outer end of the motor shaft 53 (not shown). Pinned to the sheave shaft 64 is a drive cam 65. One flange 66 of the sheave 55 includes a sleeve 67 that fits over the shaft 64. The sleeve 67 is provided with apertures 70 through which the drive cam 65 extends. The opposite flange 71 includes a collar 72 that is slidably mounted on the sleeve 67. The collar 72 includes an aperture 73 through which the other end of the drive cam 65 extends.

One substantially cup-shaped housing portion 74 is fixed to the outer end of the sleeve 67 and extends over and about the collar 72. Another housing portion 75 is telescopically related to the housing portion 74 and bears against the sheave flange 71. A compression spring 76 is located within the housing portion and about the collar 72, one end of the spring 76 bearing against housing portion 74 while the opposite end bears against the housing portion 75. The spring 76 tends to urge the sleeve flanges 66 and 71 together.

Upon exerting an increased tension on the belt 63, there is a tendency to move the sheave flanges 66 and 71 apart against the loading of the spring 76, the belt 63 moving inwardly to provide an increased speed. Conversely, upon lessening of the tension of the belt 63, the belt 63 tends to move outwardly to provide a decrease in speed, the sleeve flanges 66 and 71 moving together automatically under the spring loading to accommodate the different positions of the belt 63.

Attached to and extending vertically from the base 42 are a pair of laterally spaced upright plates 77 and 80. Rotatively mounted between the plates 77 and 80 is a cross journal 81 disposed in a substantially horizontal position, substantially parallel to the common axis of stub shafts 45 and 56. Rotatively mounted in and extending through the cross journal 81 is a screw shaft 82. A pair of collars 83 are pinned to the screw shaft 82, one collar being located ahead and one behind the cross journal 81. One end of the screw shaft 82 is provided with a handle 84 by which the shaft 82 can be manually turned. The opposite end of the screw shaft 82 is threadedly connected to the end of a stub shaft constituting a pivoted nut 85, such nut 85 being carried by the upright platform arm 50.

Upon turning the screw shaft 82 in one direction, the nut 85 will move axially along the shaft in one direction, for example rearwardly, and hence move the platform 51 and motor 52 in an arc about the axis of stub shaft 45. This action will automatically increase the tension of the belt 63 and operate through the variable sheave 55 in the manner previously described to increase the speed of the variable speed input shaft 31. To decrease the speed of the input shaft 31, the screw shaft 82 is turned in the opposite direction so as to swing the platform 51 and the motor 52 forwardly as the nut 85 travels axially along the shaft 82 in the opposite direction. This forward movement of the motor 52 lessens the tension on the belt 63 and operates automatically through the variable sheave 55 to decrease the speed of input shaft 31. Of course, it will be readily apparent that upon oscillatory movement of the platform 51 and motor 52, the speed of the differential input shaft 22 will remain substantially constant because the movement of the motor about the stub shaft 45 and the rotation of the idler sheave 60 on stub shaft 56 is on a common axis.

Figure 5:
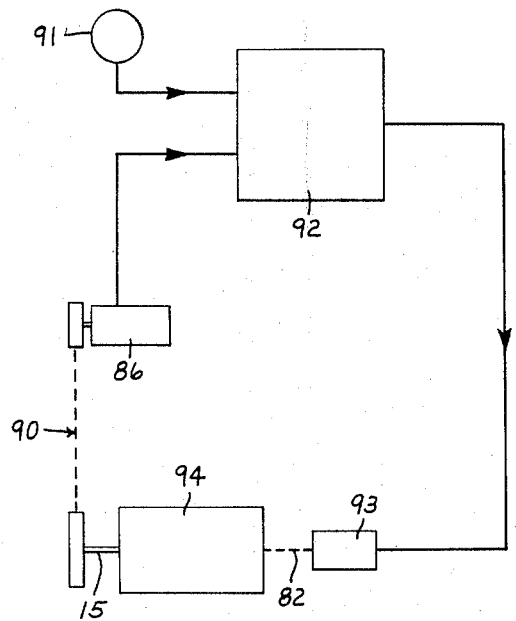
FIG. 5 is a diagrammatic view of the system for automatically regulating the output speed of the transmission.

Instead of manually adjusting the position of motor 52 and hence the speed of the differential input shaft 31 by manipulation of screw shaft 82, such adjustment can be accomplished automatically. FIG. 5 illustrates diagrammatically a system for regulating the output speed of the differential output shaft 15. The drive speed is represented by the voltage at the terminals of the tachometer generator 86 mounted by bracket 87 on the casing 11 of the differential 10. The tachometer generator 86 is operatively connected to the output shaft 15 by a belt and pulley drive connection 90. The desired speed is represented by the voltage set on the potentiometer 91. The differential amplifier 92 compares these two voltages. Any difference, or error voltage is amplified and this signal runs the speed-change motor 93, the speed-change motor 93 being drivingly connected to the screw shaft 82 to adjust the position of the platform 51 and motor 52 in the variable speed drive represented generally by reference numeral 94 in the diagrammatic drawing of FIG. 5. As is usual, the speed-change motor 93 includes a gear reducer connected to the screw shaft 82 for speed change.

The direction of rotation of the speed-change motor 93 is determined by the polarity of the error voltage. For example, if the drive speed exceeds the speed called for by the potentiometer setting, the error signal polarity will be such that the speed-change motor 93 will operate to reduce the speed of the drive and consequently to reduce the error voltage and bring the speed of the drive into agreement with the speed called for by the potentiometer setting.

Figure 6:
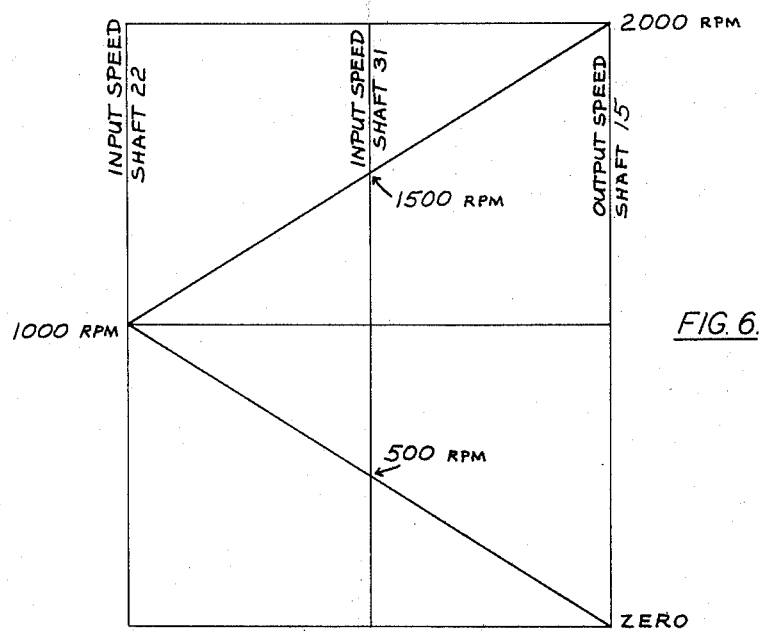
FIG. 6 is a graph illustrating the speed relationships of the differential gearing.

The operation of the differential is shown graphically in FIG. 6. The three vertical lines are equally spaced and represent the rotational speeds of the elements of the differential. The speeds of the side bevel gears 20 and 27 are represented by the two extreme lines, and that of the spider 36, to the same scale, by the center line. A straight line connecting the known speeds of any two elements will give the speed of the third where it intersects the third line.

For purposes of illustration, it will be assumed that the speed of input shaft 22 and hence the speed of the side gear 27 is maintained substantially constant at 1,000 r.p.m. The differential output shaft 15 which is operatively connected to some machine is desired to be varied from zero to approximately 2,000 r.p.m. This means that the speed of the differential input shaft 31 and the spider 36 will vary from 500 r.p.m. to 1,500 r.p.m. in order to obtain the desired output speed of differential shaft 15.

It will be assumed that it is initially desired to drive the differential output shaft 15 at 2,000 r.p.m. Through the first power transmission means, the motor 52 operates to drive the constant speed input shaft 22 at 1,000 r.p.m. This first power transmission means includes the drive sheave 54 that turns the idler pulley 60 by belt 61, the idler sheave 60 driving the differential sheave 25 at 1,000 r.p.m. The screw shaft 82 is threadly adjusted to move the platform 51 and the motor 52 in a position such that the variable sheave 55 operates through belt 63 to drive the differential sheave 34 at a predetermined speed of 1,500 r.p.m. This constitutes the second power transmission means.

If it is desired to decrease the speed of the differential output shaft 15 to zero, the screw shaft 82 is turned in a direction to swing the platform 51 and motor 52 forwardly so that the variable sheave 65 in the second power transmission means operates automatically upon lessening of tension in the drive belt 63 to decrease the speed of the variable speed input shaft 31 from 1,500 r.p.m. to 500 r.p.m. During this swinging or oscillatory movement of the motor 52, the first power transmission means consisting of motor sheave 54, idler sheave 60 and differential sheave 34 will operate to turn the input shaft 22 at the same constant speed of 1,000 r.p.m. Consequently, as the speed of the differential input shaft 31 decreases from 1,500 r.p.m. to 500 r.p.m., the speed of the differential output shaft 15 will decrease automatically from 2,000 r.p.m to zero. Of course, the speed of the differential output shaft 15 can be adjusted to any speed between zero and 2,000 r.p.m. by adjusting the position of the motor 52 upon manipulation of screw shaft 82 so that the variable sheave 55 will operate automatically to adjust the speed of the differential input shaft 31 to the appropriate value in order to realize the desired differential output speed.

Although the invention has been described by making detailed reference to a single preferred embodiment, such detal is to be understood in an instructive, rather than in any restrictive sense, many variants being possible within the scope of the claims hereunto appended.

I claim as my invention:

1. In a variable speed transmission:
 (a) a differential gearing including an output shaft interconnected by a constant speed input shaft and a variable speed input shaft,
 (b) a motor including a drive shaft,
 (c) means mounting the motor for oscillatory movement about a pivot axis offset from the motor drive shaft,
 (d) a first power transmission means including a drive element rotatively mounted at the pivot axis and operatively interconnected to the motor shaft and to the constant speed input shaft so that the motor drives the last said input shaft at a constant speed regardless of the oscillatory movement of the motor about the pivot axis, and
 (e) a second power transmission means interconnecting the motor shaft with the variable speed input shaft.

2. In a variable speed transmission:
 (a) a differential gearing including an output shaft interconnected by a constant speed input shaft and a variable speed input shaft,
 (b) a motor including a drive shaft,
 (c) means mounting the motor for oscillatory movement about a pivot axis offset from the motor drive shaft and offset from the constant speed input shaft,
 (d) a first power transmission means including a drive element rotatively mounted at the pivot axis and operatively interconnected to the motor shaft and to the constant speed input shaft so that the motor drives the last said input shaft at a constant speed regardless of the oscillatory movement of the motor about the pivot axis, and
 (e) a second power transmission means interconnecting the motor shaft with the variable speed input shaft, the second power transmission means including a drive element adjustable to different speeds automatically upon oscillatory movement of the motor about the pivot axis.

3. In a variable speed transmission:
 (a) a differential gearing including an output shaft interconnected by a constant speed input shaft and a variable speed input shaft and a variable speed input shaft,
 (b) a motor including a drive shaft,
 (c) means mounting the motor for oscillatory movement about a pivot axis,
 (d) a first power transmission means including a first drive element drivingly connected to the motor shaft,
 (e) a second drive element rotatively mounted at the pivot axis,
 (f) a first flexible member drivingly interconnecting the first and second drive elements,
 (g) a third drive element rotatable with the second drive element,
 (h) a fourth drive element drivingly connected to the constant speed input shaft, and
 (i) a second flexible member drivingly interconnecting the third and fourth drive elements, whereby the motor drives the last said input shaft at a constant speed regardless of the oscillatory movement of the motor about the pivot axis, and
 (j) a second power transmission means interconnecting the motor shaft with the variable speed input shaft.

4. In a variable speed transmission:
 (a) a differential gearing including an output shaft interconnected by a constant speed input shaft and a variable speed input shaft,
 (b) a motor including a drive shaft,
 (c) means mounting the motor for oscillatory movement about a pivot axis,
 (d) a first power transmission means including a first drive element drivingly connected to the motor shaft,
 (e) a second drive element rotatively mounted at the pivot axis,
 (f) a first flexible member drivingly interconnecting the first and second drive elements,
 (g) a third drive element rotatable with the second drive element,
 (h) a fourth drive element drivingly connected to the constant speed input shaft, and
 (i) a second flexible member drivingly interconnecting the third and fourth drive elements, whereby the motor drives the last said input shaft at a constant speed regardless of the oscillatory movement of the motor about the pivot axis, and
 (j) a second power transmission including a fifth drive element drivingly connected to the variable speed input shaft,
 (k) a sixth drive element drivingly connected to the motor shaft, and
 (l) a third flexible member drivingly interconnecting the fifth and sixth drive elements,
 (m) at least one of the fifth or sixth drive elements being variably adjustable to provide different speeds upon loosening or tightening the third flexible member as the motor is oscillated about the pivot axis.

5. A variable speed transmission as defined above in claim 4, in which:
 (n) the variable drive element in the second power transmission means is drivingly connected to the motor shaft.

6. A variable speed transmission as defined above in claim 5, in which:
 (o) the drive elements consist of sheaves and the flexible members consist of belts.

7. In a variable speed transmission:
 (a) a differential gearing including an output shaft interconnected by a constant speed input shaft and a variable speed input shaft, (b) a platform mounted on a pivot axis, (c) a motor including a drive shaft, the motor being attached to and movable with the platform, (d) a first power transmission means interconnecting the motor shaft with the constant speed input shaft and including an idler drive element rotatively mounted on the same pivot axis as the motor platform so that the distance between the motor shaft and pivot axis remains constant upon oscillatory movement of the motor about the pivot axis, (e) a second power transmission means interconnecting the motor shaft with the variable speed input shaft and including a drive element adjustable to different speeds as the distance between the motor shaft and variable speed input shaft is varied upon oscillatory movement of the motor about the pivot axis, and (f) means for selectively oscillating the platform and motor.

8. A variable speed transmission as defined above in claim 7, in which:

(g) the means for selectively oscillating the platform and motor includes a screw shaft threadedly connected to the platform, and (h) means turning the screw shaft to oscillate the platform selectively to desired positions.

9. A variable speed transmission as defined above in claim 7, in which:

(g) the means for selectively oscillating the platform and motor includes a screw shaft, (h) means rotatively and pivotally mounting the screw shaft, and (i) a nut pivotally mounted to the motor platform, the screw shaft threadedly engaging the pivoted nut to oscillate the motor platform selectively to desired positions upon turning the screw shaft.

10. A variable speed transmission as defined above in claim 7, in which:

(g) means is operatively connected to the output shaft of the differential and operatively connected to the means for moving the motor platform whereby to adjust the position of the motor platform automatically in response to variations in output shaft speed so as to maintain a predetermined output shaft speed.

11. A variable speed transmission as defined above in claim 7, in which:

(g) the means for selectively oscillating the platform and motor includes a speed-change motor connected to the platform for oscillating the platform, (h) a tachometer generator operatively connected to the output shaft of the differential, and (i) means electrically connecting the tachometer generator to the speed-change motor whereby to adjust the position of the platform automatically in response to variations of output shaft speed so as to maintain a predetermined output shaft speed.

12. In a variable speed transmission:

(a) a differential gearing including an output shaft interconnected by a constant speed input shaft and a variable speed input shaft, (b) a first stub shaft rotatively mounted, (c) a platform mounted on the first stub shaft, (d) a motor including a drive shaft, the motor being attached to and movable with the platform, (e) a second rotatively mounted stub shaft, (f) the said stub shafts having a common axis, (g) a first power transmission means interconnecting the motor shaft with the constant speed input shaft, the first power transmission means including an idler drive element mounted on the second stub shaft so that the distance between the motor shaft and pivot axis remains constant upon oscillatory movement of the motor about the pivot axis, (h) a second power transmission means interconnecting the motor shaft with the variable speed input shaft and including a drive element adjustable to different speeds as the distance between the motor shaft and the variable speed input shaft is varied upon oscillatory movement of the motor about the pivot axis, and (i) means for selectively oscillating the platform and motor.

13. In a variable speed transmission:

(a) a differential gearing including an output shaft interconnected by a constant speed input shaft and a variable speed input shaft, (b) a first and a second stub shaft mounted on a common axis, (c) a platform mounted on the first stub shaft, (d) a motor including a drive shaft, the motor being attached to and movable with the platform, (e) a first power transmission means including a first sheave drivingly connected to the motor shaft, (f) a second sheave drivingly connected to the second stub shaft, (g) a first belt drivingly interconnecting the first and second sheaves, (h) a third sheave rotatable with the second sheave on the stub shaft, (i) a fourth sheave drivingly connected to the constant speed input shaft, and (j) a second belt drivingly interconnecting the third and fourth sheaves whereby the motor drives the input shaft at a constant speed regardless of the oscillatory movement of the motor about the axis of the stub shafts, (k) a second power transmission including a fifth sheave drivingly connected to the variable speed input shaft, (l) a sixth sheave drivingly connected to the motor shaft, and (m) a second belt drivingly interconnecting the fifth and sixth sheaves, (n) the sixth sheave being variably adjustable in pitch upon loosening or tightening the second belt to provide different speeds upon oscillatory movement of the motor platform about the axis of the stub shafts, and (o) means for selectively oscillating the motor platform.

References Cited by the Examiner

UNITED STATES PATENTS

| | | | |
|---|---|---|---|
| 2,179,933 | 11/1939 | Heyer | 74—689 |
| 2,185,411 | 1/1940 | Lewellen et al. | 74—230.17 |
| 2,555,016 | 5/1951 | Trofimov | 74—689 |
| 2,903,899 | 9/1959 | Bade | 74—722 X |
| 3,051,019 | 8/1962 | Seliber | 74—689 |

DON A. WAITE, *Primary Examiner.*